(12) United States Patent  (10) Patent No.: US 7,965,179 B2
Maida  (45) Date of Patent: Jun. 21, 2011

(54) OPERATION INSTRUCTION SYSTEM, OPERATION INSTRUCTION DEVICE, OPERATION INSTRUCTION PROGRAM STORAGE MEDIUM, AND OPERATION INSTRUCTION METHOD

(75) Inventor: Masatomo Maida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1364 days.

(21) Appl. No.: 11/492,956

(22) Filed: Jul. 26, 2006

(65) Prior Publication Data

US 2007/0300102 A1    Dec. 27, 2007

(30) Foreign Application Priority Data

Apr. 28, 2006  (JP) ................................. 2006-125703

(51) Int. Cl.
*G08B 29/00*    (2006.01)
(52) U.S. Cl. ........ 340/514; 700/100; 700/109; 700/110; 700/111; 700/213; 340/525
(58) Field of Classification Search ............ 340/3.1, 340/3.7, 3.71, 525, 514, 516; 700/109, 110, 700/111, 213, 222; 702/108; 714/25; 345/173
See application file for complete search history.

(56) References Cited

U.S. PATENT DOCUMENTS

| | | | |
|---|---|---|---|
| 6,246,920 B1 | 6/2001 | Mizuno et al. | |
| 6,597,381 B1 * | 7/2003 | Eskridge et al. | 715/804 |
| 7,298,470 B2 * | 11/2007 | Tange | 356/237.2 |
| 7,316,016 B2 * | 1/2008 | DiFalco | 718/102 |
| 7,515,982 B2 * | 4/2009 | Varadhan et al. | 700/100 |
| 2005/0213742 A1 * | 9/2005 | Fukuzawa | 379/265.02 |
| 2005/0289272 A1 * | 12/2005 | Masuoka et al. | 710/260 |

FOREIGN PATENT DOCUMENTS

| | | |
|---|---|---|
| JP | 7-219627 | 8/1995 |
| JP | 7-306713 A | 11/1995 |
| JP | 2000-176648 A | 6/2000 |
| JP | 2001-42928 | 2/2001 |
| JP | 2002-297213 | 10/2002 |
| JP | 2002-373015 A | 12/2002 |
| JP | 2004-334876 | 11/2004 |
| JP | 2005-088127 | 4/2005 |
| JP | 2006-39650 A | 2/2006 |
| JP | 2006125703 A * | 5/2006 |

OTHER PUBLICATIONS

"Japanese Office Action" mailed by JPO and corresponding to Japanese application No. 2006-125703 on Apr. 19, 2011.
English translation of "Japanese Office Action" mailed by JPO and corresponding to Japanese application No. 2006-125703 on Apr. 19, 2011. (Non-English JPOA previously submitted Apr. 28, 2011.).

* cited by examiner

*Primary Examiner* — Benjamin C Lee
*Assistant Examiner* — Peter C Mehravari
(74) *Attorney, Agent, or Firm* — Fujitsu Patent Center

(57) ABSTRACT

An operation instruction method includes: an operation detecting step of detecting a manual operation; an operation detail displaying step of displaying the details of a manual operation detected at the operation detecting step; and an operation occurrence notifying step of, in response to detection of a manual operation at the operation detecting step, notifying the occurrence of the manual operation to another operation instruction device over the communication line. The operation instruction method further includes: a notification receiving step of receiving a notification of occurrence of a manual operation sent from another operation instruction device; and an operation occurrence display step of, when a notification of occurrence of a manual operation is received at the notification receiving step, displaying the occurrence of the manual operation.

10 Claims, 17 Drawing Sheets

| OPERATION INSTRUCTION MEMORY | | | | | |
|---|---|---|---|---|---|
| ID | ADDRESS | OPERATION ID | OPERATION LV | TESTING DEVICE LV | ELAPSED TIME |
| No.1 | 192.168.0.68 | 101 | 30 | 40 | 00:15:20 |
| No.2 | 192.168.0.50 | 105 | 10 | 20 | 00:08:10 |

Fig. 14

| | |
|---|---|
| OPERATION LEVEL THRESHOLD | 10 |
| TESTING DEVICE LEVEL THRESHOLD | 35 |
| ELAPSED TIME THRESHOLD | 00:05:00 |

Fig. 15

OPERATION INSTRUCTION SYSTEM, OPERATION INSTRUCTION DEVICE, OPERATION INSTRUCTION PROGRAM STORAGE MEDIUM, AND OPERATION INSTRUCTION METHOD

BACKGROUND OF THE INVENTION

1. Field of the Invention

The present invention relates to an operation instruction device for informing a manual operation among a series of operations that temporally include both automated operations and manual operations, an operation instruction system that has the operation instruction devices, an operation instruction program storage medium that stores thereon an operation instruction program that is executed in an information processing apparatus such as a computer to cause the information processing apparatus to operate as the operation instruction device, and an operation instruction method that is implemented in the information processing apparatus by the operation instruction program being executed in the information processing apparatus.

2. Description of the Related Art

Related technique will be described with reference to a testing process that is carried out in a factory manufacturing electronic devices and the like for detecting defects of manufactured products.

Such a testing process typically employs an automated testing device for improvement of productivity. When such an automated testing device is used, so-called "multi-machine test" is carried out in which one examiner takes charge of a number of automated testing devices. This is because manual operations by examiners are not required except for setup operations at start or end of testing (e.g., setup of testing devices and/or reading of bar codes for identifying products to be tested) and/or limited manual operations in the course of testing (such as visual checks, button manipulations, placement and removal of parts, and hitting a product to give it light shock).

FIG. 1 conceptually illustrates a multi-machine test.

In this case, one examiner is in charge of testing devices No. 1 to No. 4 and each of these devices carries out testing of one product in parallel.

Although such a multi-machine test can realize high productivity with a small number of examiners, it has problems as follows when considering further improvement of productivity.

(1) Loss due to delay of operation start
(2) Loss due to operation delay for a precedence operation
(3) Loss due to operation delay for a high-priority testing device
(4) Loss due to operation delay for a preceding article These problems (1) to (4) will be described sequentially.

FIG. 2 illustrates how loss can be caused by delay of operation start.

When one operator is in charge of a number of testing devices (in the example of FIG. 2, four devices), screens on which operations to be done are displayed may be not in the same orientation depending on arrangement of the testing devices, thus the operator may not notice that some manual operation has occurred and details of the operation is shown on one of the screens. As a result, the operator may start the manual operation late, which leads to reduced operation efficiency.

For example, in FIG. 2, the operator looks in the direction of testing device No. 1 and thus does not notice immediately that an operation to be done is displayed on the screen of testing device No. 4. As a result, there will be delay in operation by the time the operator notices the display.

FIG. 3 illustrates how loss can be caused by operation delay for a high-priority operation.

Part (A) of FIG. 3 illustrates temporal arrangement of manual operations and automated tests for testing one product. It is assumed here that both manual operations and automated tests are included as shown in part (A) of FIG. 3 for testing one product.

Part (B) of FIG. 3 shows temporal arrangement of manual operations and automated tests when testing devices No. 1 and No. 2 each test one product of the same kind. The case in part (B) of FIG. 3 will be referred to as Case I.

In this example, after setup operations at the start of testing are first carried out and automated test is started on testing device No. 1, setup operations for stating testing on testing device No. 2 are carried out. Subsequently, manual operations and automated tests are performed on testing devices No. 1 and No. 2 as shown in part (B) of FIG. 3, however, waiting time is caused on the testing devices because manual operation P which takes only a small amount of time such as pressing a button was not performed on testing device No. 1 until a manual operation on testing device No. 2 ended when automated operation would be continued only if manual operation P had been performed on testing device No. 1.

Whereas in Case II of part (C) of FIG. 3, since manual operation P on testing device No. 1 is preferentially performed interrupting a manual operation on testing device No. 2, waiting time on the testing devices is reduced and efficiency is improved.

However, determination of whether to interrupt an operation now being performed and prioritize another operation on another testing device is difficult for an operator who is not thoroughly familiar with the overall operations, thus efficient operations such as in Case II (part (C) of FIG. 3) is hard to be realized and a typical case tends to be operations with some loss as in Case I (part (B) of FIG. 3).

FIG. 4 illustrates loss caused by operation delay for a testing device of a high priority.

In this example, products A, B and C of three different kinds are assembled on assembly lines and testing of products A, B and C are carried out on three testing devices A, B, and C that are managed by one operator. It is assumed here that testing of product A takes a long time for one piece of the product and testing of products B and C takes less time than product A.

In this case, waiting time on testing device A needs to be minimized even by extending waiting time on testing device B and/or C for improving the entire efficiency. However, an ordinary operator would not give special handling to only testing device A and perform manual operations in an order convenient for him, which might lead to reduced efficiency.

FIG. 5 illustrates loss caused by operation delay for a preceding article.

Since it is difficult to know testing by which testing device is ahead when one operator is in charge of a number of testing devices, the operator may not adhere to fast-in-fast-out rule, that is, a product which starts to be tested earlier should pass through testing earlier and passed to the next process. Consequently, standstill in previous and subsequent processes may occur, which causes loss in terms of the entire process.

For example, FIG. 5 shows that because an operation on testing device C was performed when an operation on testing device B should be done preferentially at the time indicated by dotted line in FIG. 5, testing by testing device B is delayed by a time period indicated by arrow P, and time at which testing of the next piece is scheduled to start on testing device B has come before the testing by testing device B ends and standstill is caused due to failure to start testing of the next piece.

What is described above is not limited to testing of products but is applicable to product assembly and/or processing operations that include both automated operations and manual operations.

Although not directed to improvement of testing efficiency, Japanese Patent Laid-Open No. 2001-42928, Japanese Patent Laid-Open No. 2004-334876, and Japanese Patent Laid-Open No. 7-219627 can be referenced as techniques that are relatively close to the technical field of the present invention.

Japanese Patent Laid-Open No. 2001-42928 describes that simultaneous display is made on monitors of a number of plant monitoring devices that belong to a system when an alarm is issued. The technique disclosed by Japanese Patent Laid-Open No. 2001-42928 for displaying an alarm on multiple monitors simultaneously when an alarm is issued can be used for emergency alert when an alert is issued, however, the technique has no contribution to improvement of normal operation efficiency.

Japanese Patent Laid-Open No. 2004-334876 discloses a technique that displays notification sent for a main screen on an auxiliary screen, not the main screen. The technique disclosed by Japanese Patent Laid-Open No. 2004-334876 for displaying notification sent for a main screen on an auxiliary screen can improve operation efficiency, however, the way for improving efficiency is not known with the technique as disclosed by Japanese Patent Laid-Open No. 2004-334876 and the technique requires further technical development for making it applicable to efficiency improvement.

Japanese Patent Laid-Open No. 7-219627 discloses that information from a particular terminal is displayed using a monitor of a terminal with smaller burden when the particular terminal is burdened intensively. The technique disclosed by Japanese Patent Laid-Open No. 7-219627 for displaying on a monitor of a terminal that is less burdened addresses the problem of reducing burden on terminals and has no relation to improvement of operation efficiency.

SUMMARY OF THE INVENTION

The present invention has been made in view of the above circumstances and provides an operation instruction system that can contribute to improvement of operation efficiency, an operation instruction device preferably used in the operation instruction system, an operation instruction program storage medium that stores thereon an operation instruction program for causing an information processing apparatus to operate as the operation instruction device, and an operation instruction method that is implemented in the information processing apparatus by the operation instruction program being executed in the information processing apparatus.

The present invention provides an operation instruction system that has several operation instruction devices for indicating a manual operation among a series of operations that include both automated operations and manual operations temporally, the operation instruction devices corresponding to a series of operations that proceed simultaneously and being interconnected by a communication line, each of the operation instruction devices having:

an operation detection section that detects a manual operation;

an operation detail display section that displays the details of the manual operation detected by the operation detection section;

an operation occurrence notification section that, in response to detection of a manual operation by the operation detection section, notifies the occurrence of the manual operation to other operation instruction devices over the communication line;

a notification reception section that receives a notification of occurrence of a manual operation sent from another operation instruction device; and an operation occurrence display section that, when a notification of occurrence of a manual operation is received by the notification reception section, displays the occurrence of the manual operation.

In the operation instruction system of the invention, each of the operation instruction devices is in charge of "a series of operations" that proceed in parallel and each operation instruction device displays details of a manual operation among the "series of operations". The operation instruction devices are interconnected by a communication line and display occurrence of a manual operation on another operation instruction device, so that an operator can know that a manual operation has occurred whichever operation instruction device the operator looks at and perform the manual operation without delay.

In the operation instruction system of the invention, it is preferable that the notification reception section receives a notification of occurrence of a manual operation sent from another operation instruction device and also receives a notification of occurrence of a manual operation that is detected by the operation detection section of that operation instruction device; and when a notification of occurrence of a manual operation is received by the notification reception section, the operation occurrence display section displays the occurrence of the manual operation in different display modes depending on whether the manual operation is a manual operation on another operation instruction device or a manual operation on that operation instruction device.

This enables the operator to see at a glance whether the manual operation has occurred in the series of operation assigned to the operation instruction device which the operator now pays attention to or in a series of operation assigned to another operation instruction device and carry out an appropriate operation.

Also, in the operation instruction system of the invention, it is preferable that the operation reception section receives a notification of occurrence of a manual operation and also receives information that identifies an operation instruction device that has detected the manual operation, and the operation occurrence display section displays the occurrence of the manual operation with identification of the operation instruction device that has detected the manual operation.

This enables the operator to know promptly on which operation instruction device a manual operation has occurred and to behave more efficiently.

Moreover, in the operation instruction system of the invention, it is preferable that a manual operation is given a weight indicating the priority of the operation; the operation reception section receives a notification of occurrence of a manual operation and also receives a weight for the manual operation; and the operation occurrence display section displays the occurrence of the manual operation in different display modes depending on whether the weight for the manual operation is above a threshold value or not.

With such display in different display modes depending on the priority of a manual operation, the operator can make decision more appropriately.

Further, in the operation instruction system of the invention, it is preferable that each of the operation instruction devices is given a weight that indicates the priority of the operation; the operation reception section receives a notification of occurrence of a manual operation and also receives the weight for the operation instruction device that has detected the manual operation; and the operation occurrence display section displays the occurrence of the manual operation in different display modes depending on whether the weight for the operation instruction device that has detected the manual operation is above a threshold or not.

Such display in different display modes depending on the operation priority of an operation instruction device also helps appropriate decision making by an operator.

Further, in the operation instruction system of the invention, it is preferable that the operation reception section receives a notification of occurrence of a manual operation and also receives information indicating an elapsed time since the time at which a series of operations including the manual operation was started; and the operation occurrence display section displays the occurrence of the manual operation in different display modes depending on whether the elapsed time since the time at which a series of operation including the manual operation was started is above a threshold or not.

Such display in different display modes depending on length of an elapsed time also facilitates appropriate decision making by the operator.

The operation instruction device of the invention preferably has a displayed operation extraction section that, if there are several manual operations that should be displayed by the operation occurrence display section, extracts one manual operation from the plurality of manual operations; wherein the operation occurrence display section displays the occurrence of the manual operation extracted by the displayed operation extraction section with identification of an operation instruction device that has detected the manual operation.

Although it is possible to display manual operations as a listing when a number of manual operations occur, it is preferable that one manual operation is extracted according to priories among the manual operations and the occurrence of the extracted manual operation is displayed. This is because display of a number of operations at a time would be confusing, as when there is only one operator, the operator would have to perform manual operations one by one after all.

The present invention provides an operation instruction device that indicates a manual operation among a series of operations that include automated operations and manual operations temporally, the operation instruction device being connected to another operation instruction device via a communication line, the operation instruction device including:

an operation detection section that detects a manual operation;

an operation detail display section that displays the detail of a manual operation detected by the operation detection section;

an operation occurrence notification section that, in response to detection of a manual operation by the operation detection section, notifies the occurrence of the manual operation to another operation instruction device over the communication line;

a notification reception section that receives a notification of occurrence of a manual operation sent from another operation instruction device; and an operation occurrence display section that, when a notification of occurrence of a manual operation is received by the notification reception section, displays the occurrence of the manual operation.

The operation instruction device of the invention is preferably used for implementing the operation instruction system of the invention.

The operation instruction device of the invention encompasses all aspects that correspond to the aspects of the operation instruction system of the invention.

The present invention provides an operation instruction program storage medium having stored thereon an operation instruction program that is executed in an information processing apparatus that executes a program, the operation instruction program causing the information processing apparatus to operate as an operation instruction device for indicating a manual operation among a series of operations that include automated operations and manual operations temporally, the information processing apparatus being connected via a communication line to other information processing apparatuses that function as the operation instruction device, the operation instruction program causing the information processing apparatus to operate as an operation instruction device that includes:

an operation detection section that detects a manual operation;

an operation detail display section that displays the details of the manual operation detected by the operation detection section;

an operation occurrence notification section that, in response to detection of a manual operation by the operation detection section, notifies the occurrence of the manual operation to other operation instruction devices over the communication line;

a notification reception section that receives a notification of occurrence of a manual operation passed from another operation instruction device; and an operation occurrence display section that, when a notification of occurrence of a manual operation is received by the notification reception section, displays the occurrence of the manual operation.

The operation instruction program storage medium of the invention encompasses all aspects for realizing the aspects of the operation instruction system of the invention.

Further, the present invention provides an operation instruction method that is implemented in an information processing apparatus through execution of an operation instruction program that is executed in an information processing apparatus that executes a program, the operation instruction program causing the information processing apparatus to operate as an operation instruction device that indicates a manual operation among a series of operations that include automated operations and manual operations temporally, the information processing apparatus being connected via a communication line to other information processing apparatuses that function as the operation instruction device, the method including:

an operation detecting step of detecting a manual operation;

an operation detail displaying step of displaying the details of a manual operation detected at the operation detecting step;

an operation occurrence notifying step of, is response to detection of a manual operation at the operation detecting step, notifying the occurrence of the manual operation to another operation instruction device;

a notification receiving step of receiving a notification of occurrence of a manual operation sent from another operation instruction device; and an operation occurrence display step of, when a notification of occurrence of a manual operation is received at the notification receiving step, displaying the occurrence of the manual operation.

The operation instruction method of the invention also encompasses all of various operation instruction methods that correspond to the aspects of the operation instruction system of the invention.

As has been thus described, according to the invention, operation efficiency is improved by appropriate indication of an operation.

BRIEF DESCRIPTION OF THE DRAWINGS

FIG. 14 shows operation instruction entries that are stored in the operation instruction memory;

FIG. 15 illustrates a threshold table that is used as reference for determination;

DETAILED DESCRIPTION OF THE INVENTION

Embodiments of the invention will be described.

Figure 1:
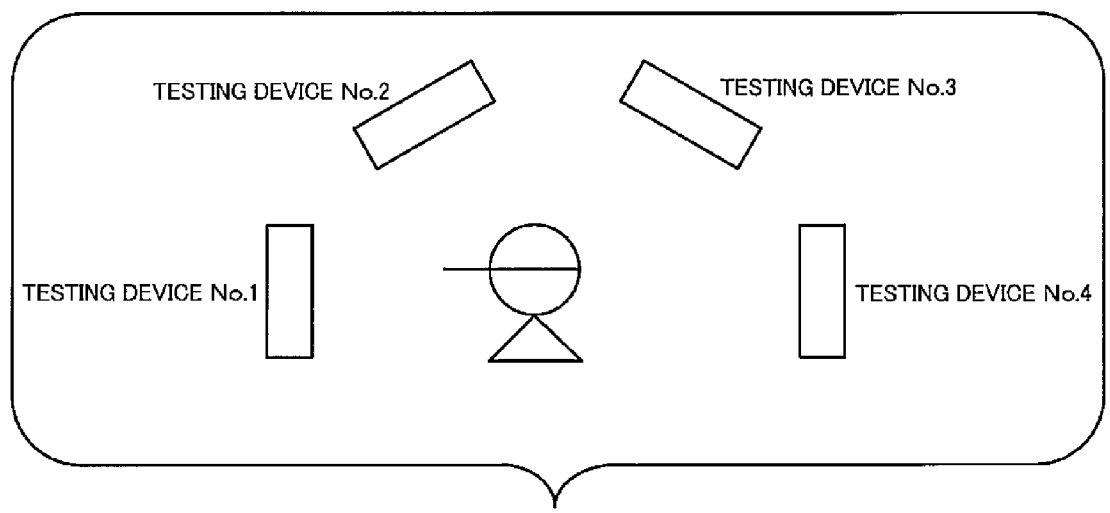
FIG. 1 conceptually illustrates a multi-machine test.
Figure 2:
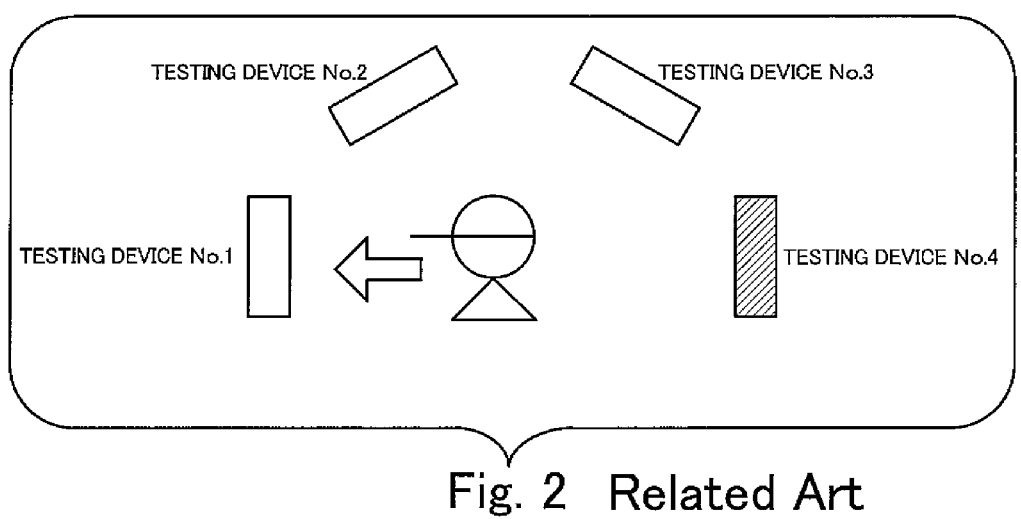
FIG. 2 illustrates how loss can be caused by delay of operation start.
Figure 3:
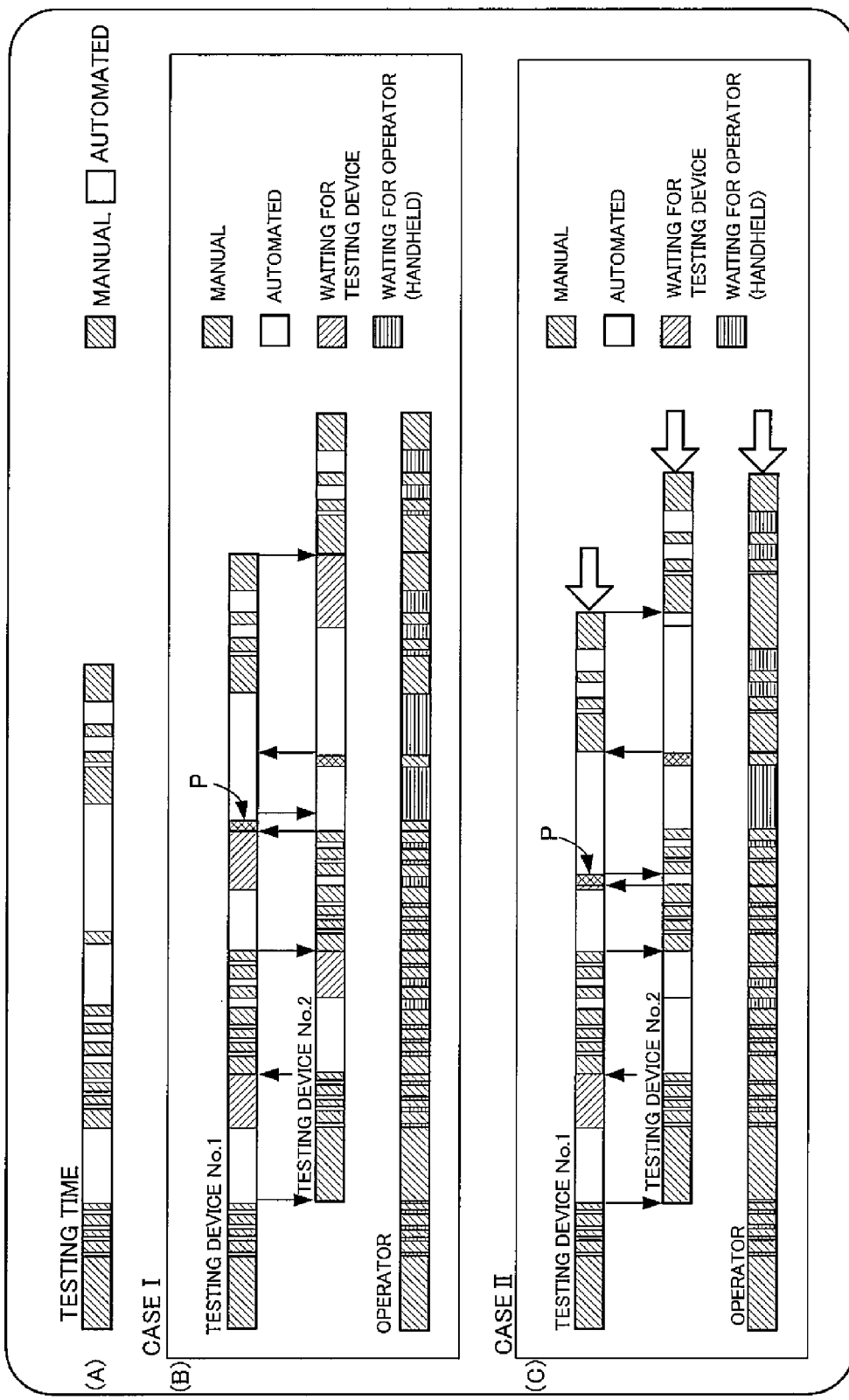
FIG. 3 illustrates how loss can be caused by operation delay for a precedence operation.
Figure 4:
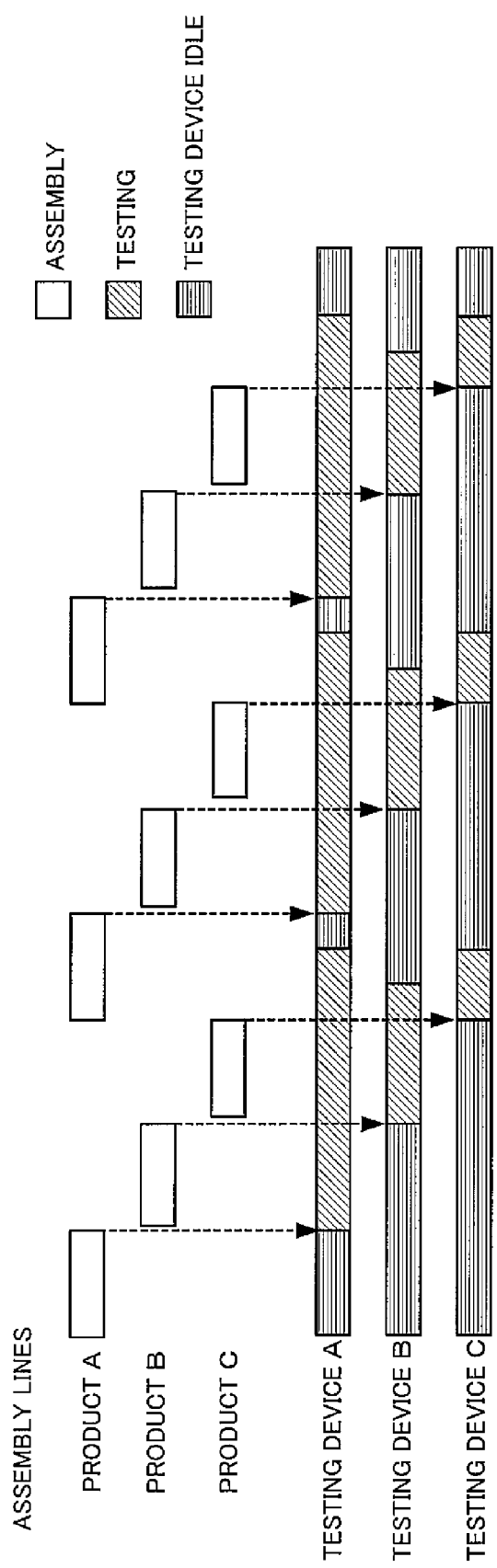
FIG. 4 illustrates how loss can be caused by operation delay for a testing device of a high priority.
Figure 5:
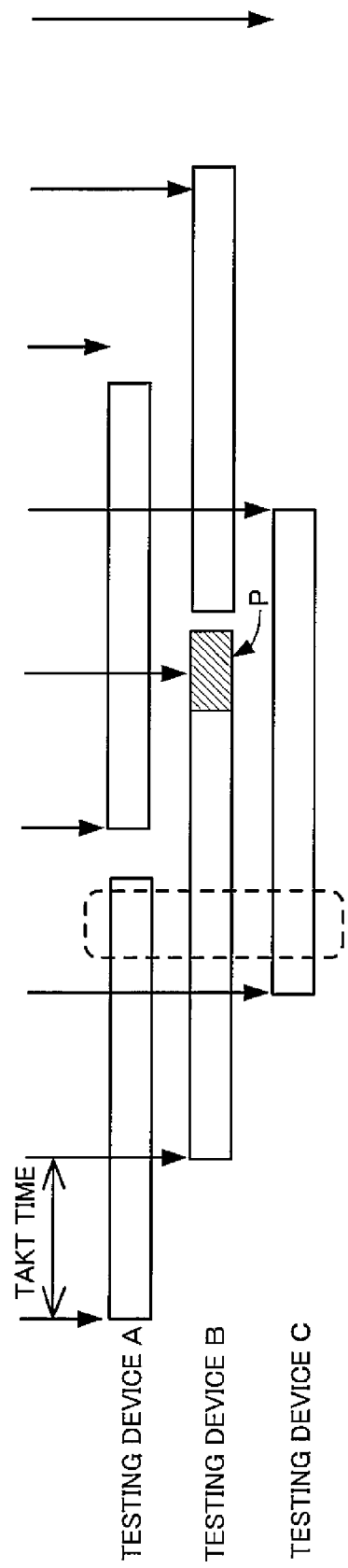
FIG. 5 illustrates how loss can be caused by operation delay for a preceding article.
Figure 6:
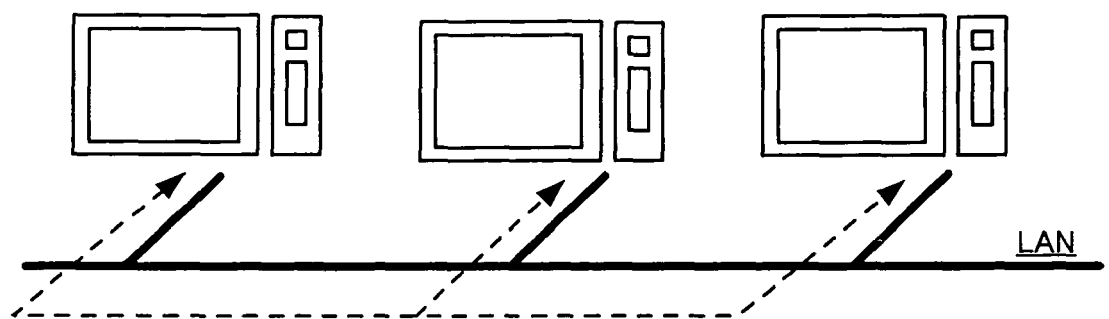
FIG. 6 shows a number of testing devices that are interconnected by a Local Area Network (LAN)

FIG. 6 illustrates multiple testing devices that are interconnected by a Local Area Network (LAN).

While the Figure shows three testing devices No. 1 to No. 3, this is only illustrative and more testing devices may be connected by the LAN.

Each of the testing devices is a testing device for performing a series of tests that include both automated tests and manual operations temporally on each piece of product, and is a personal computer (hereinafter abbreviated as "PC") here. The testing devices also serve as the operation instruction devices according to the embodiment of the invention.

The testing devices to which the LAN is connected are grouped into groups of testing devices each of which is managed by one operator, and sending/receiving of messages to be discussed below is made within the groups. For example, when the three testing devices No. 1 to No. 3 shown in FIG. 6 are managed by one operator and thus form one group, a message sent by any one of the testing devices (here testing device No. 1 as an example) is sent to all the testing devices that form the group (here testing devices No. 1 to No. 3). Although a message originated from testing device No. 1 is also received by itself (i.e., testing device No. 1) in this embodiment, it is also possible that a message originated from testing device No. 1 is received by other testing devices belonging to the same group (here testing devices No. 2 and No. 3), and as to testing device No. 1 itself, that is, the testing device at which the message originates, the message may be passed within the testing device No. 1 without passing through the LAN.

Figure 7:
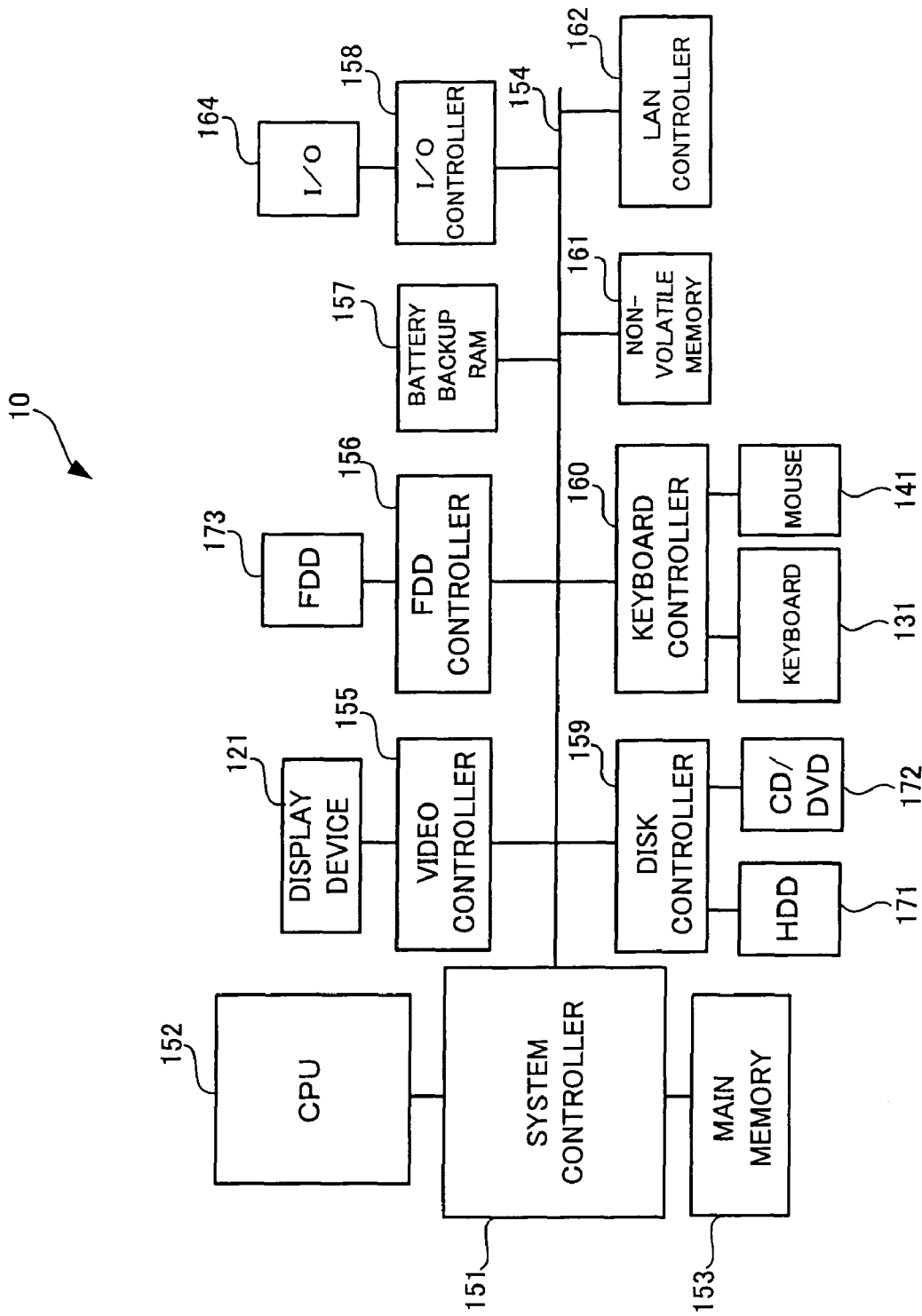
FIG. 7 shows the internal components of a PC that form any one of the testing devices shown in FIG. 6 (e.g., testing device No. 1)

FIG. 7 illustrates internal components of a PC that forms any one of the testing devices shown in FIG. 6 (e.g., testing device No. 1).

A PC 10 shown in FIG. 7 includes a system controller 151. To the system controller 151, a CPU 152 and a main memory 153 are connected, and further connected via a bus 154 are a video controller 155, a FDD controller 156, a battery back-up RAM 157, an I/O controller 158, a disk controller 159, a keyboard controller 160, a non-volatile memory 161, and a LAN controller 162.

The system controller 151 is an element responsible for control of the entire system, the CPU 152 is an element responsible for execution of a program loaded into the main memory 153, and the main memory 153 is memory in which a program read out from a hard disk (HD) included in a hard disk drive (HDD) 171 is loaded for execution at the CPU 152 and is used as work area for executing the program.

The video controller 155 controls display of images on a display device 121 according to instructions from the CPU 152 via the system controller 151, and the FDD controller 156 is for controlling a FD drive (FDD) 173 that manages access to an inserted floppy (a registered trademark) disk (FD). The battery back-up RAM 157 is memory for storing various kinds of configuration information for the PC 10. The I/O controller 158 is an element responsible for control of I/O 164 that outputs signals to a product to be tested and receives signals from the product, a product to be tested being connected via the I/O 164 here.

The disk controller 159 is an element for accessing a hard disk drive (HDD) 171 included in the PC 10 and/or a CD/DVD 172 that is externally mounted. The HDD 171 contains a hard disk (HD) and the HD has stored thereon an operating system (OS) and/or various application programs. Those programs are read out under control of the disk controller 159 according to instructions by the system controller 151 and loaded into the main memory 153 for execution by the CPU 152.

A CD and/or DVD in which various programs are stored can be mounted to the CD/DVD drive 172 and accessed under control of the disk controller 159, so that the programs and the like stored in the CD/DVD are uploaded to the PC 10 and stored in the HDD contained in the HDD 171.

The keyboard controller 160 serves to detect operation of a keyboard 131 and a mouse 141 and communicate results of the detection to the system controller 151. The non-volatile memory 161 has stored thereon a program called Basic Input Output System (BIOS) that is first executed after the PC 10 is powered on. The LAN controller 162 is an element that performs communication with other testing devices (PCs) over the LAN line.

Figure 8:
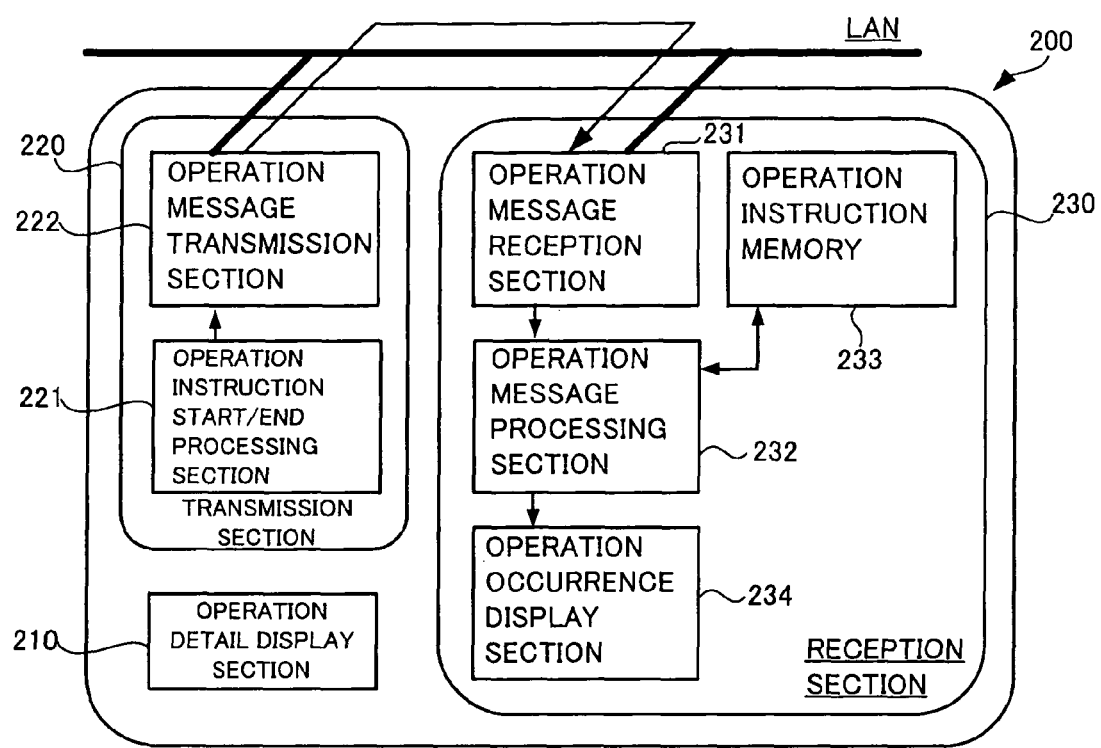
FIG. 8 shows a functional configuration as the operation instruction device of the invention that is implemented in the testing device (PC) shown in FIGS. 6 and 7.

FIG. 8 illustrates a functional configuration as the operation instruction device of the invention that is constructed in the testing device (PC) shown in FIGS. 6 and 7.

Since the embodiment is not interested in what kind of testing is performed on what kind of product but only in the functions of the testing device (PC) as the operation instruction device of the invention, FIG. 8 only shows functions of the testing device (PC) shown in FIGS. 6 and 7 as an embodiment of the operation instruction device according to the invention.

The functions shown in FIG. 8 are functions that are realized in the PC shown in FIGS. 6 and 7 by a program to be discussed later (see FIGS. 11 to 13) being executed in the PC. Here, the collection of the functions shown in FIG. 8 is called an operation instruction device 200.

The operation instruction device 200 shown in FIG. 8 includes an operation display section 210, a transmission section 220, and a reception section 230.

In response to occurrence of a manual operation on a testing device (PC) into which the operation instruction device 200 is incorporated, the operation display section 210 displays details on the manual operation on the display screen of the display device 121 (see FIG. 7) of the testing device, thereby notifying the operator to perform the manual operation according to the displayed details. The operator can then perform the manual operation seeing and following the details.

The transmission section 220 includes an operation instruction start/end processing section 221 and an operation message transmission section 222. When a manual operation occurs on a testing device (PC) into which the operation instruction device 200 is incorporated, the operation instruction start/end processing section 221 generates an operation message indicating the occurrence of the manual operation on the testing device (PC) and passes the message to the operation message transmission section 222. The operation message transmission section 222 sends over the LAN the message received from the operation instruction start/end processing section 221 to individual testing devices (PCs) that form a group to which the operation instruction device 200 belongs and which is managed by one operator so as to notify a manual operation has occurred on the testing device (PC).

When termination of the manual operation is informed to the testing device (PC) through a key operation by the operator, for example, the operation display section 210 deletes the display indicating details of the operation that has been shown on the display screen, and the operation instruction start/end processing section 221 generates an operation message indicating the termination and the operation message transmission section 222 sends the operation message to other testing devices (PC) of the same group over the LAN.

The reception section 230 of the operation instruction device 200 includes an operation message reception section 231, an operation message processing section 232, an operation instruction memory 233, and an operation occurrence display section 234.

The operation message reception section 231 receives an operation message that is sent from any one of a number of testing devices (PCs) belonging to one group over the LAN. The operation message reception section 231 also receives operation messages sent by the operation message transmission section 222 of the testing device (PC) that includes the operation message reception section 231 itself.

When an operation message received by the operation message reception section 231 is an operation start message indicating occurrence of a manual operation, the operation message processing section 232 writes the message to the operation instruction memory 233, and when an operation message received by the operation message reception section 231 is an operation end message indicating termination of a manual operation, the operation message processing section 232 deletes an operation start message that corresponds to the received operation end message indicating the termination of a manual operation from among operation start messages indicating occurrence of manual operations that are stored in the operation instruction memory 233.

Further, the operation message processing section 232 reads out an operation message that is extracted according to its priority as discussed below from among operation messages indicating occurrence of manual operations that are stored in the operation instruction memory 233 in a manner described above, and passes the message to the operation occurrence display section 234. The operation occurrence display section 234 indicates on the screen of the display device 121 (see FIG. 7) that a manual operation corresponding to an operation message passed from the operation message processing section 232 has occurred. When a new operation message is passed from the operation message processing section 232, the operation occurrence display section 234 changes the display to indication of occurrence of a manual operation according to the new operation message. When all operation messages stored in the operation instruction memory 233 have been deleted, the operation message processing section 232 notifies the operation occurrence display section 234 that the operation instruction memory 233 is now empty, and the operation occurrence display section 234 in response deletes the indication of occurrence of the manual operation shown on the display screen.

Figure 9:
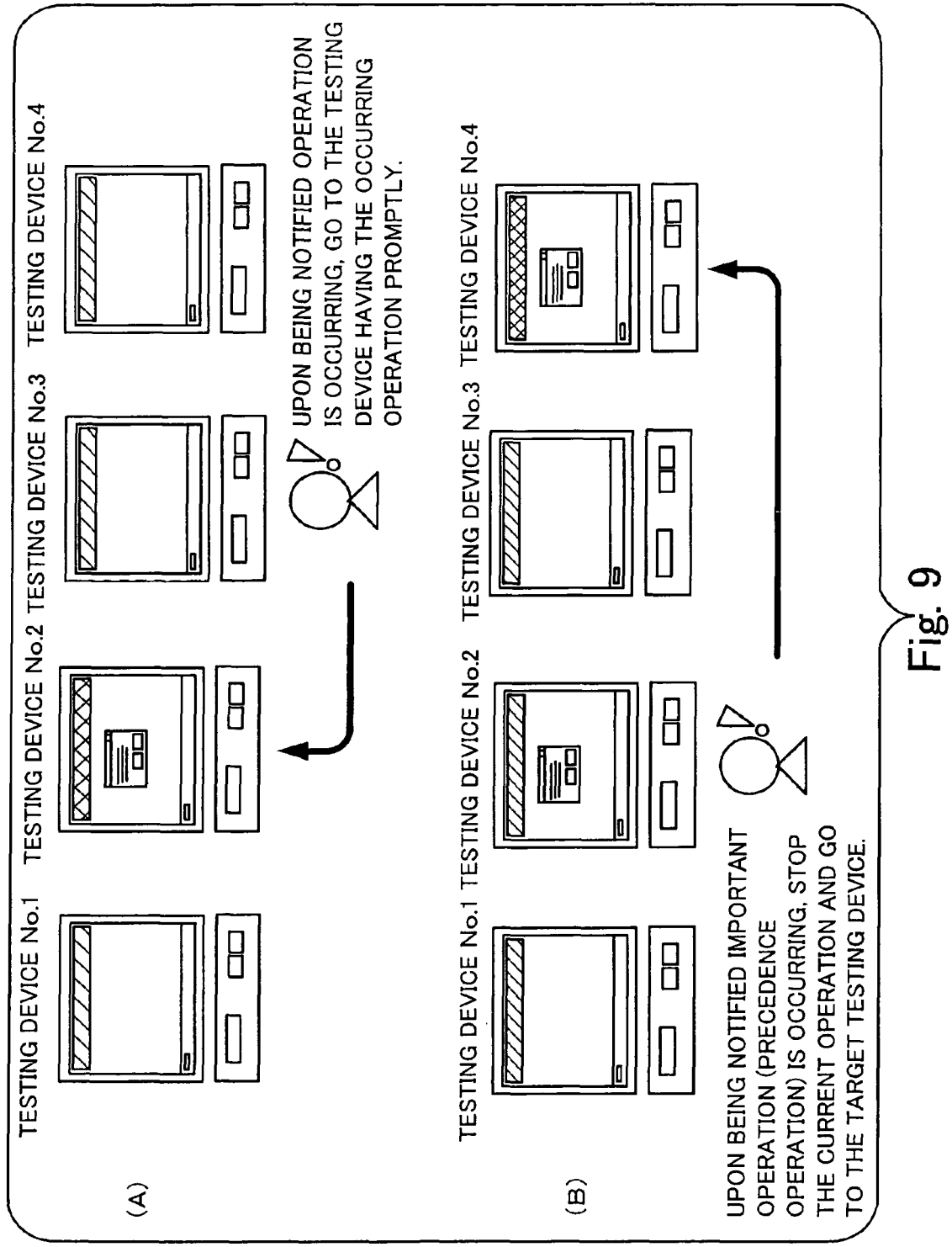
FIG. 9 illustrates display modes on the operation instruction device shown in FIG. 8.
Figure 10:
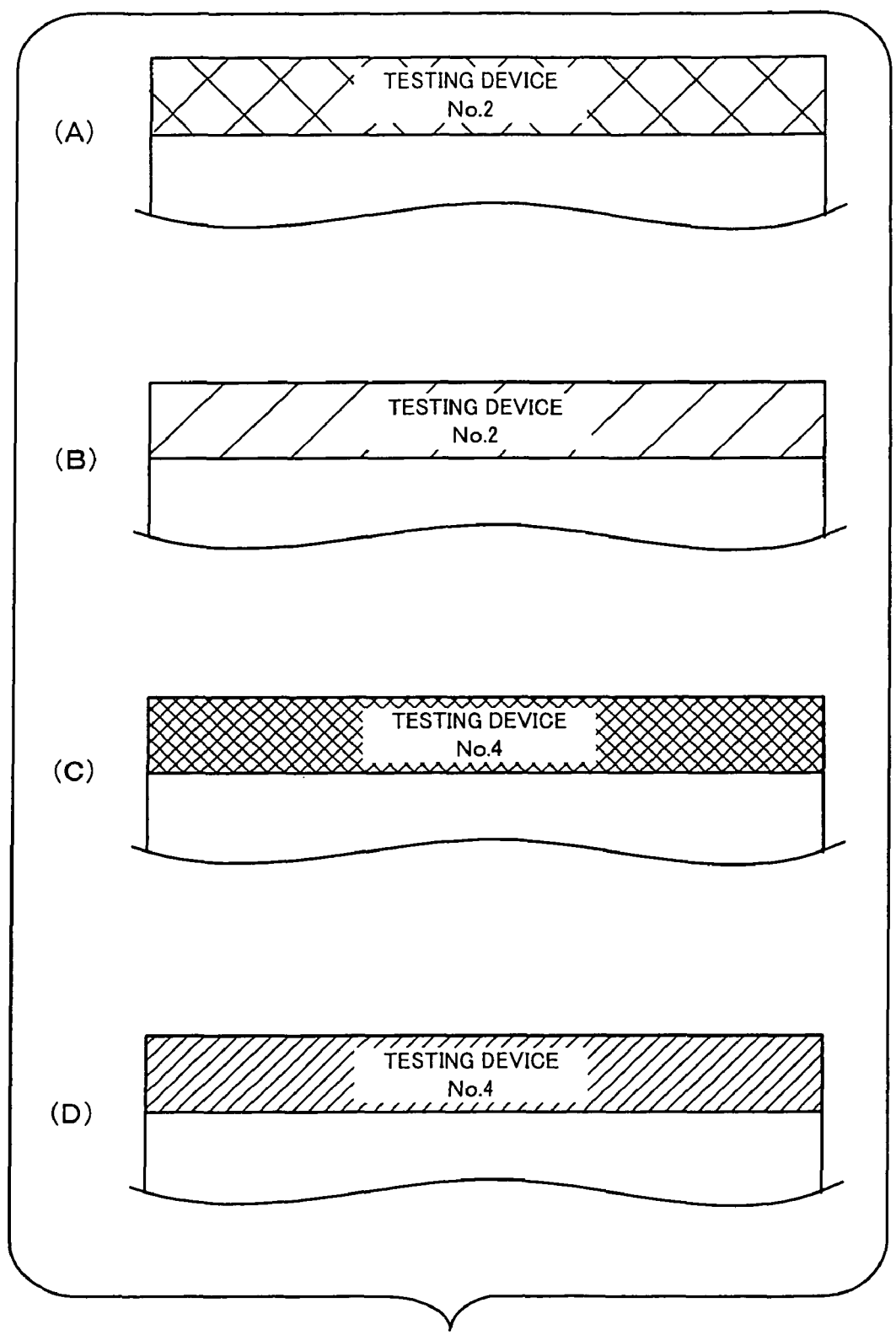
FIG. 10 shows enlarged upper portion of display screens.

FIG. 9 illustrates display modes on the operation instruction devices shown in FIG. 8; and FIG. 10 shows enlarged upper portions of display screens.

In this embodiment, manual operations are separated into normal operations and important operations (precedence operations), and normal operations and important operations (precedence operations) are indicated in different colors as will be described below.

Part (A) of FIG. 9 shows a display mode for a normal operation and it is assumed here that a manual operation at the level of normal operation has occurred on testing device No. 2 among four testing devices No. 1 to No. 4. In this case, a screen showing details of the manual operation that has occurred pop ups in the center of the display screen of testing device No. 2 and the upper portion of the display screen blinks as a blue band.

Part (A) of FIG. 10 illustrates display of the upper portion of the display screen of testing device No. 2 at this point: display of "testing device No. 2" indicates that a manual operation has occurred on testing device No. 2 itself. The color of blue indicates the operation is a normal operation and blinking of the blue color indicates the manual operation is occurring on the very device (here, testing device No. 2).

On testing devices No. 1, No. 3, and No. 4 shown in FIG. 9, in response to the occurrence of the manual operation on testing device No. 2, a band of a pale blue color appears on the upper portion of their display screens.

Part (B) of FIG. 10 illustrates the upper portion of display screens of testing devices No. 1, No. 3 and No. 4 at this point: display of "testing device No. 2" indicates that a manual operation is occurring on testing device No. 2. Also, display in pale blue means the operation is a normal operation and display in continuous lighting rather than blinking indicates that the manual operation is occurring on another testing device of the same group rather than the device itself.

Assume that the operator is facing testing device No. 3 as shown in part (A) of FIG. 9 when the display such as shown in part (A) of FIG. 9 appears. Seeing the pale blue band indication appearing on the display screen of testing device No. 3, the operator can know that a manual operation has occurred on testing device No. 2 and go to testing device No. 2 promptly to start the manual operation on testing device No. 2.

Part (B) of FIG. 9 illustrates a display mode for when an important operation (precedence operation) occurs, and it is assumed here that an important operation which should be carried out preferentially has occurred on testing device No. 4 while the operator is performing an manual operation facing testing device No. 2.

In this case, display of the band in the upper portion of display screens of testing devices No. 1 to No. 4 changes while the pop-up screen in the center of the screen of testing device No. 2 indicating the details of the normal operation remains unchanged.

This description assumes that an important operation occurs on testing device No. 4 and in this case, details on the important operation occurring on testing device No. 4 pops up in the center of the display screen of testing device No. 4 and a red band is also displayed blinking in the upper portion of the display screen of testing device No. 4.

Part (C) of FIG. 10 illustrates display in the upper portion of the display screen of testing device No. 4 at this point: display of "testing device No. 4" indicates that the operation is occurring on testing device No. 4 itself. Also, the color of red means occurrence of an important operation, and blinking of the red band indicates the important operation has occurred on this testing device (here, testing device No. 4).

In addition, as shown in part (B) of FIG. 9, in response to the occurrence of the important operation on testing device No. 4, a pale red band appears in the upper portion of the display screens of testing devices No. 1 to No. 3.

Part (D) of FIG. 10 shows display in the upper portion of the display screens of testing devices No. 1 to No. 3 that appears at this point. Again, "testing device No. 4" is displayed, indicating that an operation manual has occurred on testing device No. 4. Display in pale red means the operation is an important operation, and continuous lighting display, not blinking display, indicates that the important operation is occurring not on the device itself but another testing device in the same group.

If an important operation occurs on testing device No. 4 while the operator is facing testing device No. 2 and performing a normal operation seeing its details shown on the display screen of testing device No. 2 as shown in part (B) of FIG. 9, the operator can notice an important operation is occurring on testing device No. 4 upon seeing the pale red band appearing on the display screen of testing device No. 2 and move to testing device No. 4 even if he stops the normal operation he is performing on testing device No. 2 to complete the important operation preferentially.

The following will describe the operation instruction program that is executed in the testing devices (PCs) for realizing the displays described above. Here, again, as shown in FIG. 9, assume that one operator is in charge of the four testing devices No. 1 to No. 4 and, for the purpose of description, the operation instruction program to be discussed below is executed on testing device No. 1. However, the same instruction program as one described below is executed on all of testing devices No. 1 to No. 4, not only on testing device No. 1.

Figure 11:
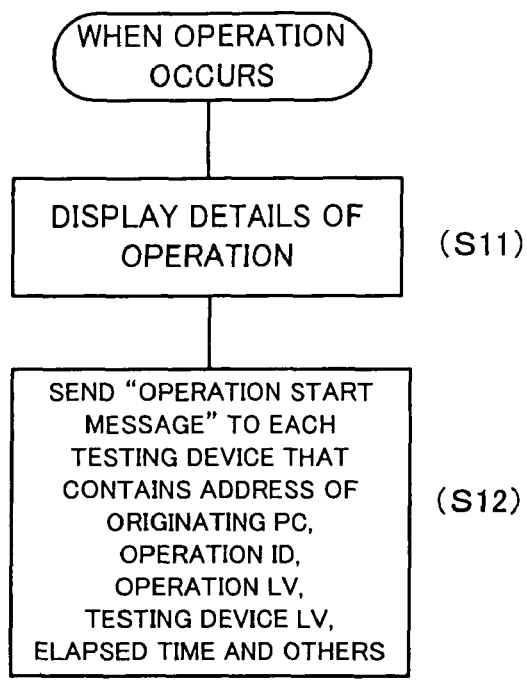
FIG. 11 is a flowchart illustrating a program included in the operation instruction program that is executed when a manual operation occurs.

FIG. 11 is a flowchart illustrating a program included in the operation instruction program that is executed when a manual operation occurs.

When a manual operation occurs on testing device No. 1, details on the manual operation pops up in the center of the display screen of testing device No. 1 (step S11). Further, an "operation start message" is transmitted to testing devices No. 1 to No. 4 in the same group (including testing device No. 1 itself) (step S12), the operation start message containing the address of the originating PC (i.e., the IP address of testing device No. 1), an operation ID (an ID identifying the occurring manual operation), an operation LV (a value that indicates the priority (level) of the occurring manual operation), a testing device LV (here, a value indicating the priority (level) of testing device No. 1), an elapsed time period (a duration from set-up of a target product on testing device No. 1 and start of testing on the product to the current time) and the like.

Figure 12:
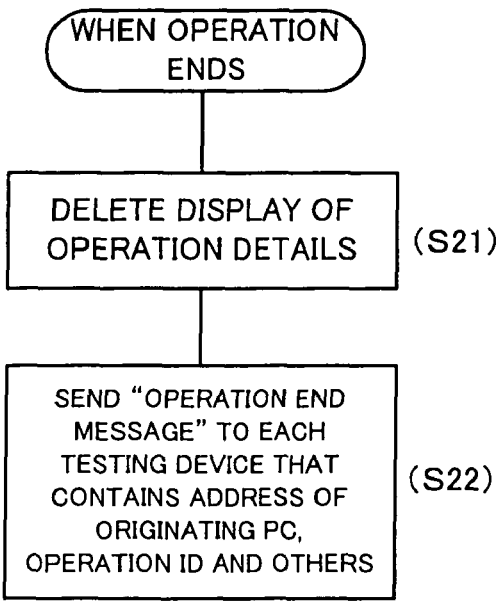
FIG. 12 is a flowchart illustrating a program included in the operation instruction program that is executed when a manual operation ends.

FIG. 12 is a flowchart illustrating a program included in the operation instruction program that is executed when a manual operation completes.

The program shown in FIG. 12 is executed when the operator sees a pop-up screen on the display screen of testing device No. 1 and performs the manual operation, and informs testing device No. 1 that he ended the operation such as with manipulation of a button. In this program, the pop-up screen on the display screen of testing device No. 1 (display screen indicating what should be done) is first deleted (step S21), and an "operation end message" containing the address of the originating PC (i.e., the IP address of testing device No. 1 at which the operation ended), an operation ID (an ID identifying the manual operation terminated) and the like is sent to testing devices No. 1 to No. 4 in the same group (including testing device No. 1 itself).

Figure 13:
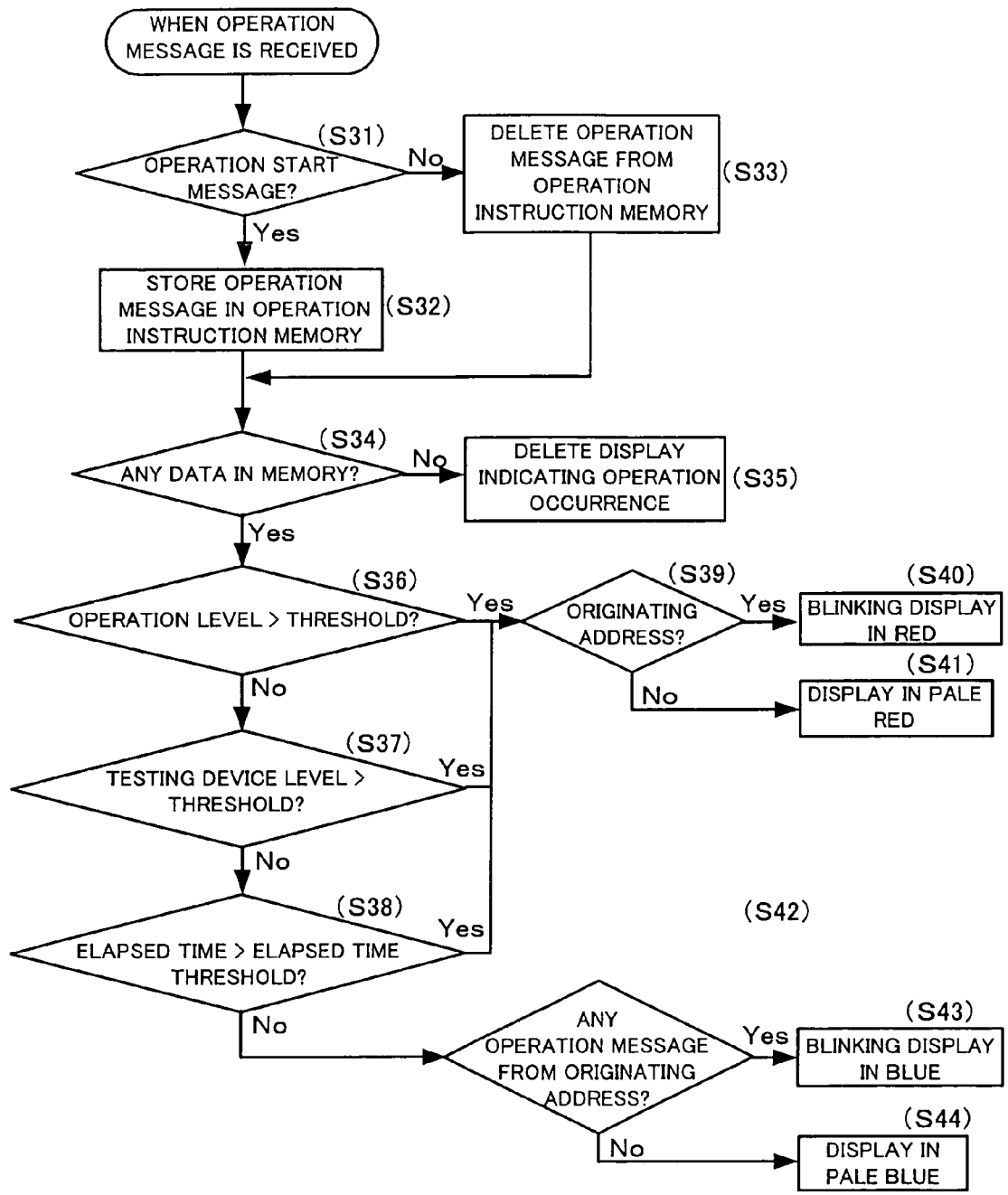
FIG. 13 is a flowchart illustrating a program included in the operation instruction program that is executed when an operation message is received.

FIG. 13 is a flowchart illustrating a program included in the operation instruction program that is executed when an operation message is received.

The program shown in FIG. 13 is executed either when an operation message is received and the message is sent from any one of testing devices No. 1 to No. 4 of the same group including testing device No. 1, that is, the originating device, or when the operation message is an operation start message (see FIG. 11) or an operation end message (see FIG. 12).

When an operation message is received, determination is made as to whether the received message is an operation start message or an operation end message (step S31), and if the operation message is an operation start message, the message is stored in the operation instruction memory 233 (see FIG. 8) (step S32). However, if the received operation message is an operation end message, an operation message corresponding to the received operation end message is deleted from among operation start messages stored in the operation instruction memory (step S33).

FIG. 14 shows operation instruction entries that are stored in the operation instruction memory of testing device No. 1 after the process described above.

Here, two operation messages are stored as an example, and each of the operation messages includes an ID that identifies the testing device at which the operation message originated, the IP address of the testing device, an operation ID identifying the manual operation that has occurred, an operation LV indicating the priority of the manual operation, a testing device LV that indicates the priority of the testing device where the manual operation occurred, and an elapsed time since testing of one product was started on the testing device.

Although, in this embodiment, an elapsed time recorded in a received operation message is stored in the memory as it is, the elapsed time may be updated over time.

Then, all operation messages stored in the operation instruction memory are searched to make determinations as discussed below.

FIG. 15 illustrates a threshold table that is used as reference for the determination described below.

The operation instruction memory of testing devices No. 1 to No. 4 not only records operation messages but stores such a threshold table shown in FIG. 15. The threshold table is fixedly preset by an operator who configures the testing device.

FIG. 15 shows a threshold table for testing device No. 1 as an example, in which value of 10 is set as the operation level threshold, a value of 35 is set as the testing device level threshold, and 5 minutes is set as the elapsed time threshold.

Description will be continued with reference to FIG. 13 again.

At step S34, determination is made as to whether any data representing an operation message is stored in the operation instruction memory or the memory is empty, and if there is no data in the memory, indication of operation occurrence (here, the band in the upper portion of the display screen of testing device No. 1) is deleted (step S35).

However, if there is any operation message stored in the operation instruction memory, it is determined whether there is any operation that exceeds the operation level threshold (step S36), whether its testing device level is above the testing device level threshold (step S37), and whether its elapsed time exceeds the elapsed time threshold (step S38) sequentially for all the messages stored.

The operation messages stored in the operation instruction memory are being checked in sequence, and if an operation message indicating that any of operation level, testing device level, or elapsed time exceeds the threshold is found, then at step S39, in accordance with whether the operation message is an operation message from the address of the testing device itself (i.e., the address of testing device No. 1 here) or from an address of another device (the address of any of testing devices No. 2 to No. 4 here) (step S39), blinking display in red is implemented when the message is from the address of the device itself (step S40), or continuous lighting display in pale red is implemented when from the address of another device (step S41).

Meanwhile, if the operation level, testing device level, and elapsed time are all equal to or below thresholds for all the operation messages stored in the operation instruction memory, then, at step S42, it is determined whether there is any operation message that originated from the address of the testing device itself (testing device No. 1 here) in the operation instruction memory. If there is an operation message that originated from the address of the testing device itself, blinking display in blue is provided for the operation message, and if there is no message originated from the address of the testing device itself, continuous lighting display in pale blue is provided for an operation message that was issued from the address of another testing device. If there are multiple operation messages from addresses of other devices, some adjustment is made for making display for an operation message that has the longest elapsed time, for example.

FIGS. 16 to 19 illustrate flows of reception of an operation message and display on each testing device.

Figure 16:
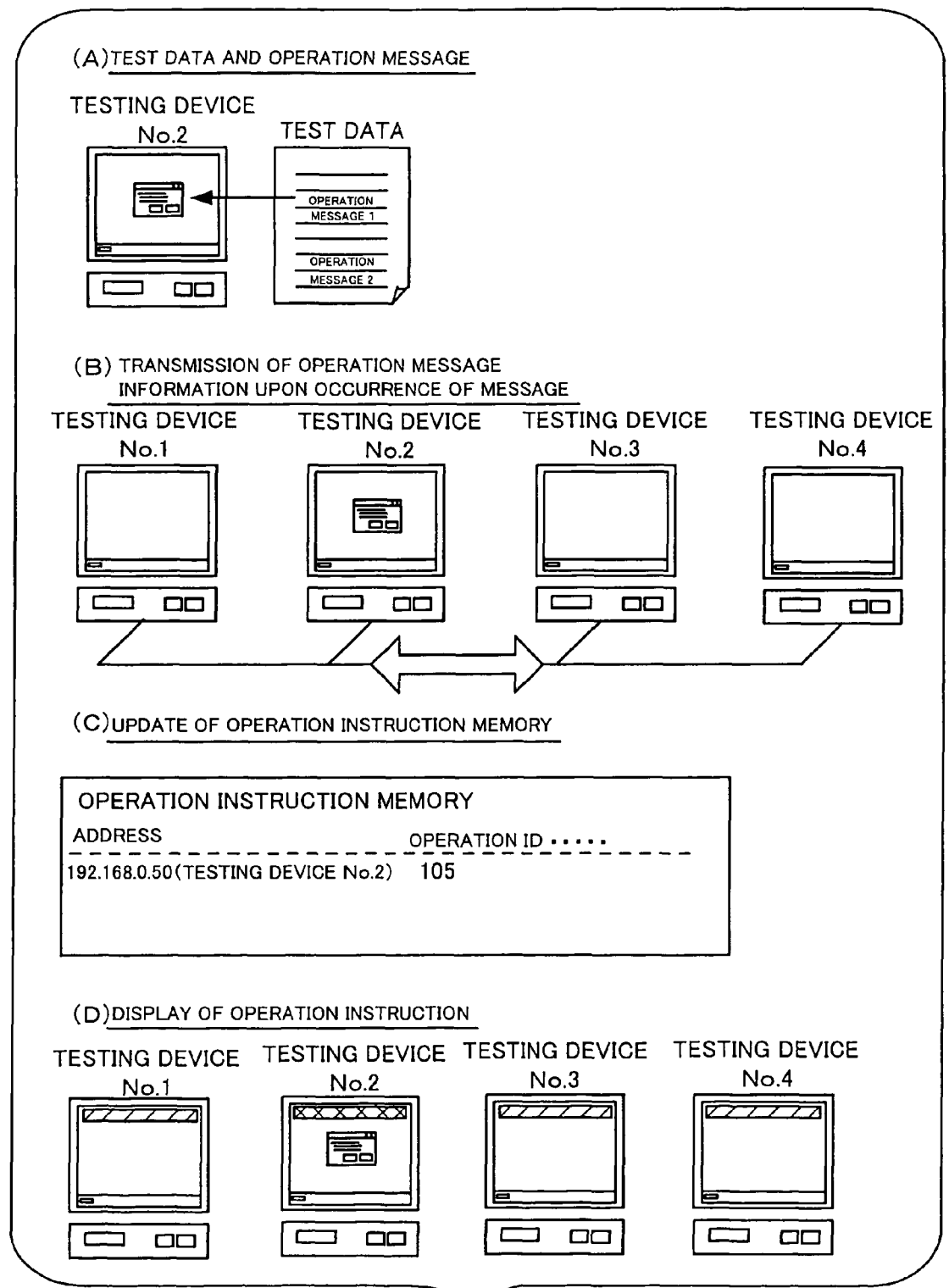
FIG. 16 shows flow of reception of an operation message and display on testing devices.

FIG. 16 shows a normal operation, where when a manual operation of normal operation level occurs on testing device No. 2, a pop-up screen first appears in the center of the display screen of testing device No. 2 for indicating details on the occurring manual operation (part (A) of FIG. 16), and an operation message for informing the occurrence of the manual operation is sent from testing device No. 2 to testing devices No. 1 to No. 4 of the same group including the originating address (here, testing device No. 2) (part (B) of FIG. 16). Then, contents of the operation instruction memory of testing devices No. 1 to N.4 is updated (part (C) of FIG. 16), and a band appears in the upper portion of the display screens of testing devices No. 1 to No. 4 (part (D) of FIG. 16). The band is displayed blinking in blue on testing device No. 2 at which the manual operation has occurred, and continuously lights in pale blue on other testing devices No. 1, No. 3 and No. 4.

Figure 17:
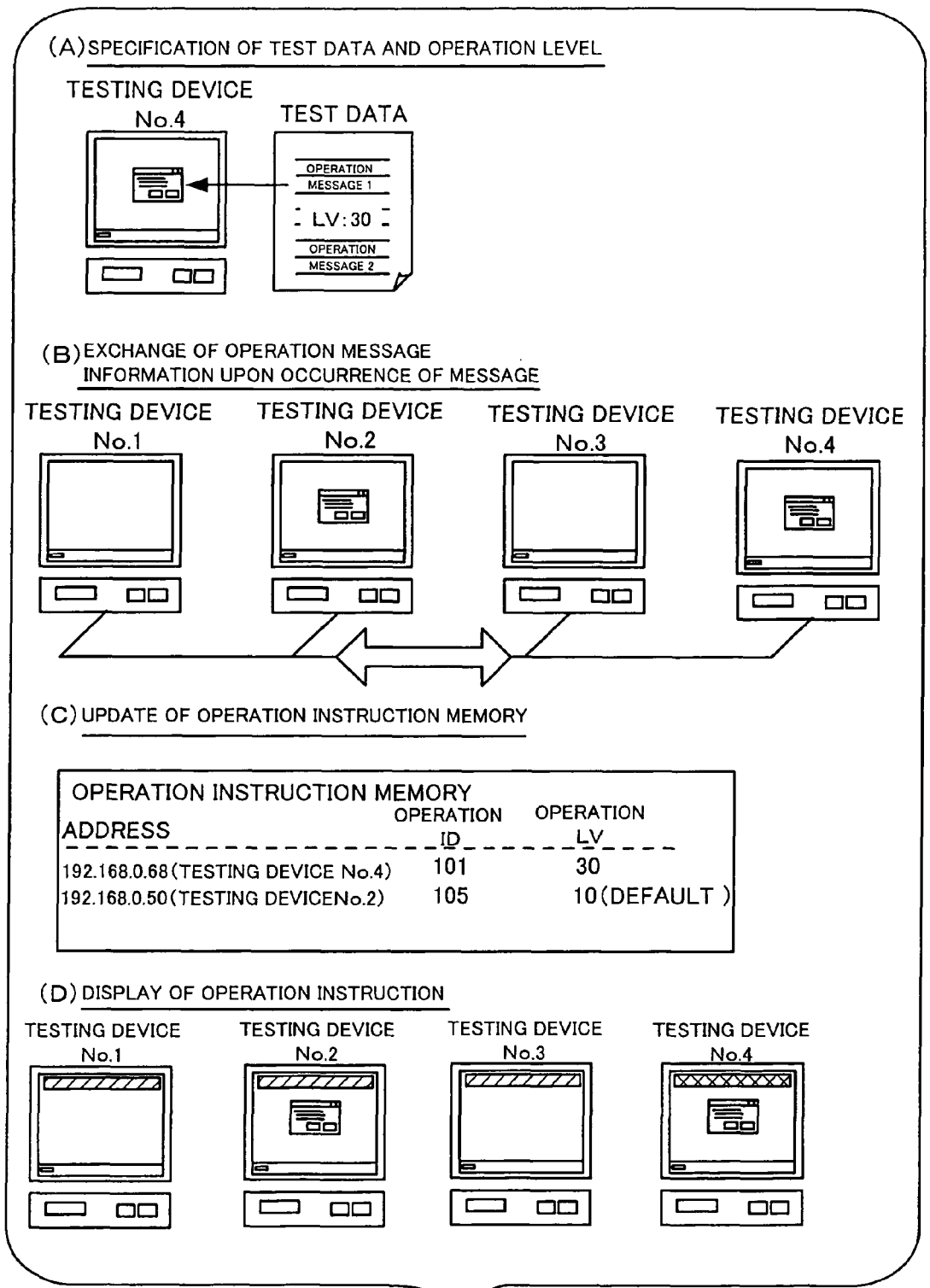
FIG. 17 shows flow of reception of an operation message and display on testing devices.

FIG. 17 illustrates operations that are done when a precedence operation with high operation level occurs.

Assume that a manual operation of high operation level has occurred on testing device No. 4 while display shown in part (D) of FIG. 16 is being made. When a manual operation of high operation level occurs on testing device No. 4, a pop-up screen indicating details on the manual operation first appears on the display screen of testing device No. 4 (part (A) of FIG. 17), and an operation message informing the occurrence of the manual operation is sent from testing device No. 4 to testing devices No. 1 to No. 4 of the same group including the originating address (here, testing device No. 4) (part (B) of FIG. 17). Contents of operation instruction memory is updated on testing devices No. 1 to No. 4 (part (C) of FIG. 17), and the band displayed in the upper portion of display screen of testing devices No. 1 to No. 4 is switched to blinking display in red on testing device No. 4 at which the precedence operation occurred and switched to continuous lighting display in pale red on other testing devices. The pop-up screen at the point of part (A) of FIG. 16 remains displayed in the center of the display screen of testing device No. 2.

Figure 18:
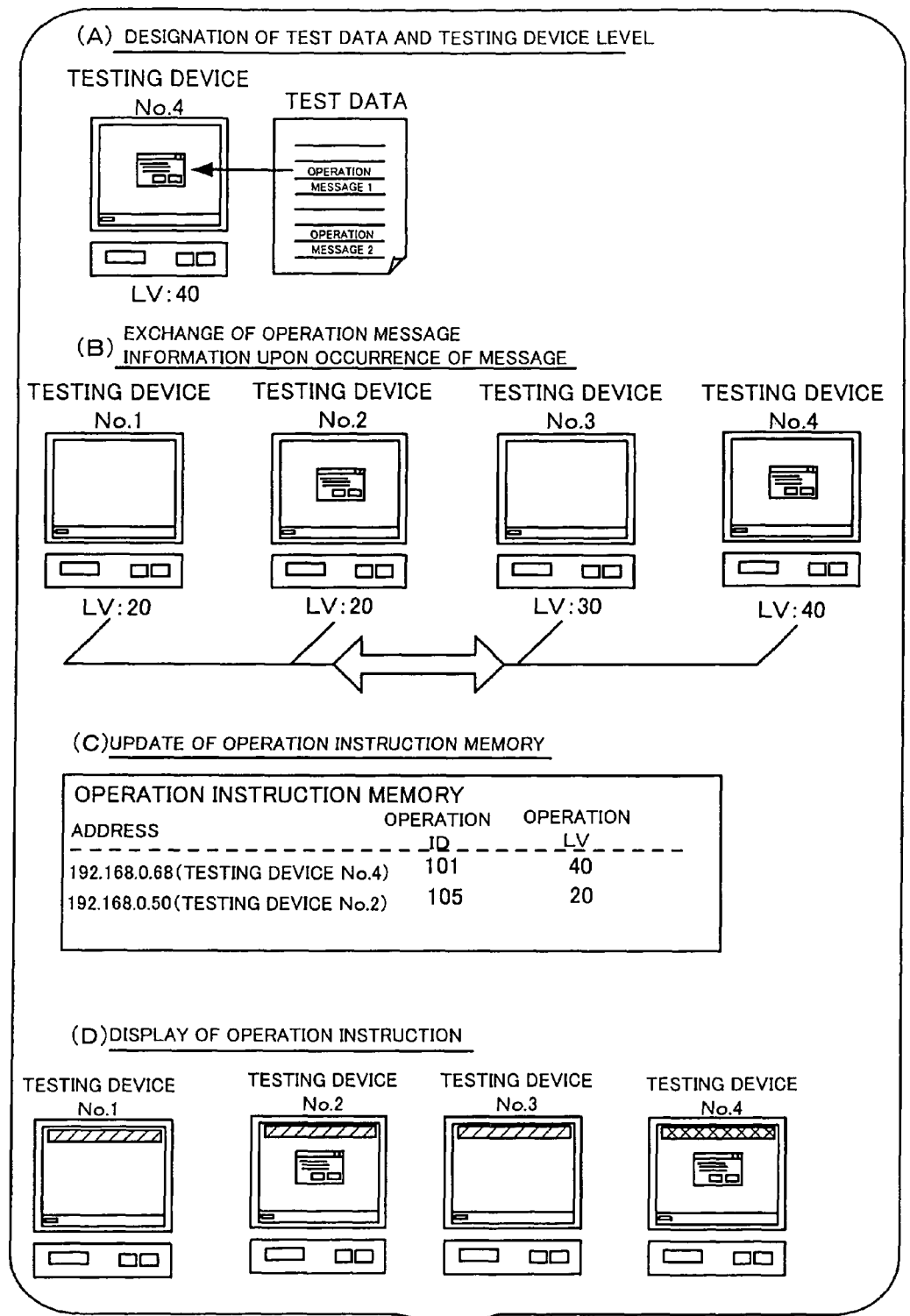
FIG. 18 shows flow of reception of an operation message and display on testing devices.

FIG. 18 illustrates operations that are done when a precedence operation of high testing device level occurs.

It is again assumed that a manual operation of high testing device level has occurred on testing device No. 4 while the display shown in part (D) of FIG. 16 is being made. When a manual operation of testing device level LV 40 occurs on testing device No. 4, a pop-up screen indicating details of the manual operation first appears in the center of the display screen of testing device No. 4 (part (A) of FIG. 18), and an operation message indicating the occurrence of the manual operation is sent from testing device No. 4 to testing devices No. 1 to No. 4 of the same group including the originating address (here, testing device No. 4) (part (B) of FIG. 18). Contents of the operation instruction memory is updated on testing devices No. 1 to No. 4 (part (C) of FIG. 18), and the band shown in the upper portion of display screens of the testing devices No. 1 to No. 4 is switched to blinking display in red on testing device No. 4 and to continuous lighting display in pale red on other testing devices. In the center of the display screen of testing device No. 2, the pop-up screen at the point of part (A) of FIG. 16 remains displayed.

Figure 19:
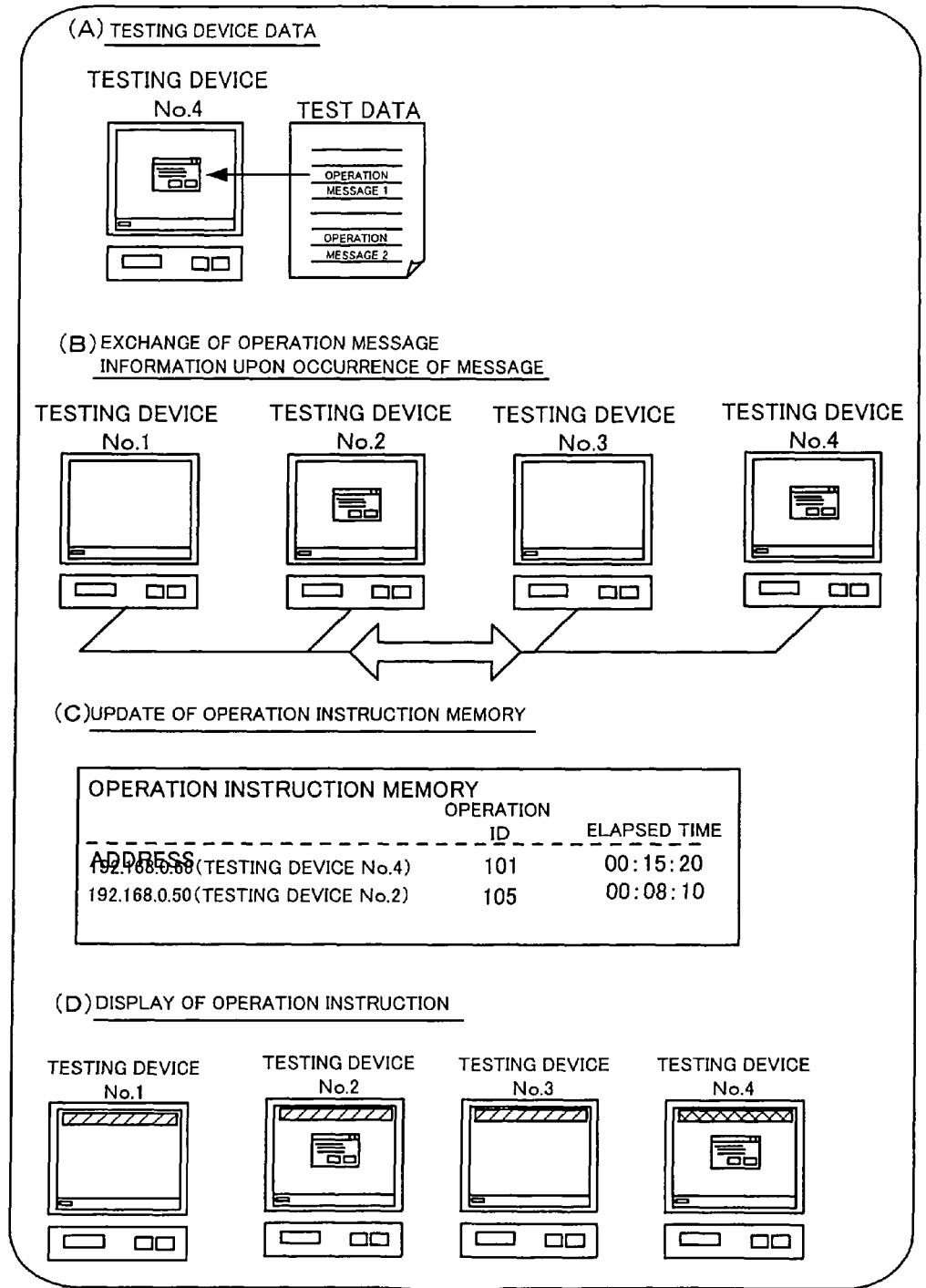
FIG. 19 shows flow of reception of an operation message and display on testing devices.

FIG. 19 illustrates operations for when a precedence operation that has a long elapsed time has occurred. It is again assumed that a manual operation of a long elapsed time occurs on testing device No. 4 while display of part (D) of FIG. 16 is being made. When a manual operation of a long elapsed time occurs on testing device No. 4, a pop-up screen indicating details of the manual operation first appears on the display screen of testing device No. 4 (part (A) of FIG. 19), and an operation message informing the occurrence of the manual operation is sent from testing device No. 4 to testing devices No. 1 to No. 4 of the same group including the originating address (here, testing device No. 4) (part (B) of FIG. 19). Contents of operation instruction memory is updated on testing devices No. 1 to No. 4 (part (C) of FIG. 19), and the band in the upper portion of the display screens of testing devices No. 1 to No. 4 is switched to blinking display in red on testing device No. 4, where the precedence operation has occurred, and to continuous lighting display in pale red on other testing devices. In the center of the display screen of testing device No. 2, the pop-up screen at the point of part (A) of FIG. 16 remains displayed.

While the present invention has been described with reference to testing devices as an example, the invention is applicable to testing devices as well as apparatuses that involve a series of operations that include both automated operations and manual operations temporally (e.g., an assembly machine for assembling a product and/or a processing machine for processing parts).

What is claimed is:

1. An operation instruction system that has a plurality of operation instruction devices each of which indicates a manual operation among a series of operations that include both automated operations and manual operations temporally, the plurality of operation instruction devices corresponding to a plurality of series of operations that proceed simultaneously, respectively and indicating a manual operation among a corresponding series of operations of the plurality of series of operations, wherein:
   the plurality of operation instruction devices are interconnected by a communication line, and
   each of the plurality of operation instruction devices includes,
   an operation detection section that detects an instruction for performing a manual operation on the each operation instruction device;
   an operation detail display section that displays details of the manual operation instructed by the instruction detected by the operation detection section;
   an operation occurrence notification section that, in response to the detection of the instruction for performing the manual operation by the operation detection section, notifies occurrence of the instruction for performing the manual operation on the each operation instruction device to other operation instruction devices of the plurality of operation instruction devices over the communication line;
   a notification reception section that receives a notification of occurrence of an instruction for performing a manual operation on one of the other operation instruction devices which is sent from the one operation instruction device; and
   an operation occurrence display section that, when the notification of the occurrence of the instruction for performing the manual operation on the one operation instruction device is received by the notification reception section, displays the occurrence of the instruction for performing the manual operation on the one operation instruction device.

2. The operation instruction system according to claim 1, wherein the notification reception section receives the notification of the occurrence of the instruction for performing the manual operation on one of the other operation instruction devices, which is sent from the one other operation instruction device, and also receives a notification of occurrence of the instruction for performing the manual operation on the each operation instruction device that is detected by the operation detection section of the each operation instruction device, and
   when the notification of the occurrence of the instruction for performing the manual operation on one of the other operation instruction devices or on the each operation instruction device is received by the notification reception section, the operation occurrence display section displays the occurrence of the instruction for performing the manual operation in different display modes depending on whether the instruction for performing the manual operation is on the one other operation instruction device or on the each operation instruction device.

3. The operation instruction system according to claim 1, wherein the operation reception section receives the notification of the occurrence of the instruction for performing the manual operation on the one other operation instruction device and also receives information that identifies the one other operation instruction device, and
   the operation occurrence display section displays the occurrence of the instruction for performing the manual operation with identification of the one other operation instruction device.

4. The operation instruction system according to claim 1, wherein the manual operation instructed by the instruction on the one other operation instruction device is given a weight indicating a priority of the manual operation,
   the operation reception section receives the notification of the occurrence of the instruction for performing the manual operation on the one other operation instruction device and also receives the weight for the manual operation, and
   the operation occurrence display section displays the occurrence of the instruction for performing the manual operation on the one operation instruction device in different display modes depending on whether the weight for the manual operation is above a threshold value or not.

5. The operation instruction system according to claim 1, wherein the one other operation instruction device is given a weight that indicates a priority of the one other operation instruction device,
   the operation reception section receives the notification of the occurrence of the instruction for performing the manual operation on the one other operation instruction device and also receives the weight for the one other operation instruction device, and
   the operation occurrence display section displays the occurrence of the instruction for performing the manual operation on the one other operation instruction device in different display modes depending on whether the weight for the one other operation instruction devices is above a threshold or not.

6. The operation instruction system according to claim 1, wherein the operation reception section receives the notification of the occurrence of the instruction for performing the manual operation on the one other operation instruction device and also receives information indicating an elapsed time that has elapsed since a series of operations of the plurality of series of operations, corresponding to the one other operation instruction device and including the manual operation instructed by the instruction on the one other operation instruction device, was started, and
   the operation occurrence display section displays the occurrence of the instruction for performing the manual operation in different display modes depending on whether the elapsed time is above a threshold or not.

7. The operation instruction system according to claim 3, wherein the each operation instruction device further comprises a displayed operation extraction section that, when there are a plurality of instructions for performing manual operations each occurrence of which should be, as the occurrence of the instruction for performing the manual operation on the one other operation instruction device, displayed by the operation occurrence display section, extracts one instruction for performing a manual operation from the plurality of instructions for performing the manual operations, and the operation occurrence display section displays the occurrence of the one instruction for performing the manual operation extracted by the displayed operation extraction section with identification of an operation instruction device of the plurality of operation instruction devices that has detected the one instruction for performing the manual operation.

8. An operation instruction device that indicates a manual operation among a series of operations that include both automated operations and manual operations temporally, and is connected to other operation instruction devices via a communication line, the operation instruction device comprises:

an operation detection section that detects an instruction for performing a manual operation on the operation instruction device;

an operation detail display section that displays details of the manual operation instructed by the instruction on the operation instruction device which is detected by the operation detection section;

an operation occurrence notification section that, in response to the detection of the instruction for performing the manual operation by the operation detection section, notifies occurrence of the instruction for performing the manual operation on the operation instruction device to the other operation instruction devices over the communication line;

a notification reception section that receives a notification of occurrence of an instruction for performing a manual operation on one of the other operation instruction devices which is sent from the one of the other operation instruction devices; and an operation occurrence display section that, when the notification of the occurrence of the instruction for performing the manual operation on the one other operation instruction device is received by the notification reception section, displays the occurrence of the instruction for performing the manual operation on the one other operation instruction device.

9. An operation instruction program storage medium having stored thereon an operation instruction program that is executed in an information processing apparatus that executes a program, the operation instruction program causing the information processing apparatus to operate as an operation instruction device which indicates a manual operation among a series of operations that include automated operations and manual operations temporally, wherein:

the information processing apparatus is connected via a communication line to other information processing apparatuses that operate as the operation instruction device, and the information processing apparatus that operates as the operation instruction device through the execution of the operation instruction program comprising:

an operation detection section that detects an instruction for performing a manual operation on the information processing apparatus that operates as the operation instruction device through the execution of the operation instruction program;

an operation detail display section that displays details of the manual operation instructed by the instruction on the information processing apparatus, that operates as the operation instruction device through the execution of the operation instruction program, which is detected by the operation detection section;

an operation occurrence notification section that, in response to the detection of the instruction for performing the manual operation by the operation detection section, notifies occurrence of the instruction for performing the manual operation on the information processing apparatus, that operates as the operation instruction device through the execution of the operation instruction program, to the other information processing apparatuses that operates as the operation instruction device over the communication line;

a notification reception section that receives a notification of occurrence of an instruction for performing a manual operation on one of the other information processing apparatuses, that operates as the operation instruction device, which is sent from the one other information processing apparatus that operates as the operation instruction device; and an operation occurrence display section that, when the notification of the occurrence of the instruction for performing the manual operation on the one other information processing apparatus, that operates as the operation instruction device, is received by the notification reception section, displays the occurrence of the instruction for performing the manual operation on the one information processing apparatus that operates as the operation instruction device.

10. An operation instruction method that is implemented in an information processing apparatus through execution of an operation instruction program that is executed in the information processing apparatus that executes a program, the operation instruction program causing the information processing apparatus to operate as an operation instruction device that indicates a manual operation among a series of operations that include automated operations and manual operations temporally, wherein:

the information processing apparatus is connected via a communication line to other information processing apparatuses that operate as the operation instruction device, and the method comprises:

detecting an instruction for performing a manual operation on the information processing apparatus that operates as the operation instruction device through the execution of the operation instruction program;

displaying details of the manual operation instructed by the instruction on the information processing apparatus, that operates as the operation instruction device through the execution of the operation instruction program, which is detected by the detecting;

in response to the detection of the instruction for performing the manual operation by the detecting, notifying occurrence of the instruction for performing the manual operation on the information processing apparatus, that operates as the operation instruction device through the execution of the operation instruction program, to the other information processing apparatuses that operates as the operation instruction device over the communication line;

receiving a notification of occurrence of an instruction for performing a manual operation on one of the other information processing apparatuses, that operates as the operation instruction device, which is sent from the one other information processing apparatus that operates as the operation instruction device; and when the notification of the occurrence of the instruction for performing the manual operation on the one other information processing apparatus, that operates as the operation instruction device, is received by the receiving, displaying the occurrence of the instruction for performing the manual operation on the one other information processing apparatus that operates as the operation instruction device.

\* \* \* \* \*